(12) United States Patent
Brogliatti et al.

(10) Patent No.: US 6,564,225 B1
(45) Date of Patent: May 13, 2003

(54) METHOD AND APPARATUS FOR ARCHIVING IN AND RETRIEVING IMAGES FROM A DIGITAL IMAGE LIBRARY

(75) Inventors: Barbara Spencer Brogliatti, Encino, CA (US); Christopher Grakal, Los Angeles, CA (US); Lisa A. Janney, Los Angeles, CA (US); Marisa B. O'Neil, Los Angeles, CA (US); Thomas G. Smith, Darien, CT (US)

(73) Assignee: Time Warner Entertainment Company, L.P., New York, NY (US)

( * ) Notice: Subject to any disclaimer, the term of this patent is extended or adjusted under 35 U.S.C. 154(b) by 330 days.

(21) Appl. No.: 09/616,546

(22) Filed: Jul. 14, 2000

(51) Int. Cl.[7] .............................................. G06F 17/30
(52) U.S. Cl. .......................... 707/104.1; 707/1; 707/10
(58) Field of Search ....................... 707/1, 9–10, 104.1, 707/204

(56) References Cited

U.S. PATENT DOCUMENTS

| | | | | |
|---|---|---|---|---|
| 5,493,677 A | * | 2/1996 | Balogh et al. | 707/104.1 |
| 5,517,605 A | * | 5/1996 | Wolf | 707/104.1 |
| 5,617,119 A | * | 4/1997 | Briggs et al. | 358/1.1 |
| 5,813,009 A | * | 9/1998 | Johnson et al. | 707/100 |
| 5,893,101 A | * | 4/1999 | Balogh et al. | 358/1.1 |
| 5,915,038 A | * | 6/1999 | Abdel-Mottaleb et al. | 358/1.9 |
| 6,123,362 A | * | 9/2000 | Squilla et al. | 281/31 |
| 6,167,382 A | * | 12/2000 | Sparks et al. | 705/14 |
| 6,332,146 B1 | * | 12/2001 | Jebens et al. | 345/428 |
| 6,349,373 B2 | * | 2/2002 | Sitka et al. | 705/2 |
| 6,396,963 B2 | * | 5/2002 | Shaffer et al. | 283/67 |
| 6,427,032 B1 | * | 7/2002 | Irons et al. | 382/306 |

* cited by examiner

Primary Examiner—Safet Metjahic
Assistant Examiner—Hanh Thai
(74) Attorney, Agent, or Firm—O'Melveny & Myers LLP

(57) ABSTRACT

A method and apparatus for securely archiving, searching, and retrieving images from a centralized image location are provided. Along with the goal of protecting a major corporate asset from theft and damage with the passage of time, the present invention provides an economical way for users from different divisions to share previously produced images and composites. Furthermore, by utilizing ultra-high resolution scanning in the archival process, re-creation of images that are of substantially the same quality as the original is achieved. Thus, ultra-high scanning allows re-creation of images that are photo-quality acceptable for commercial use in magazines, video packaging, movie posters, etc. With a centralized system of storage and distribution of images, it is possible for users to take advantage of a single and comprehensive catalog/index of all content. By using pre-defined image content criteria, users locate, select, and retrieve particular images stored in the system. Users are then able to create folders to place selected images and send the contents to others for approval or comments. Folders containing selected images may also be sent to fulfillment departments such as photo labs for re-creation of images in a variety of formats, including transparencies (from 35 mm to 8×10 to 12' murals), prints (both in color and in B&W), CD-ROMs for Macintosh™ and PC platforms, ZIP™ disks, JAZZ™ disks, any electronic mail formats, and File Transfer Protocol (FTP). Users may also track, in real-time, the status of their order during the fulfillment process.

44 Claims, 14 Drawing Sheets

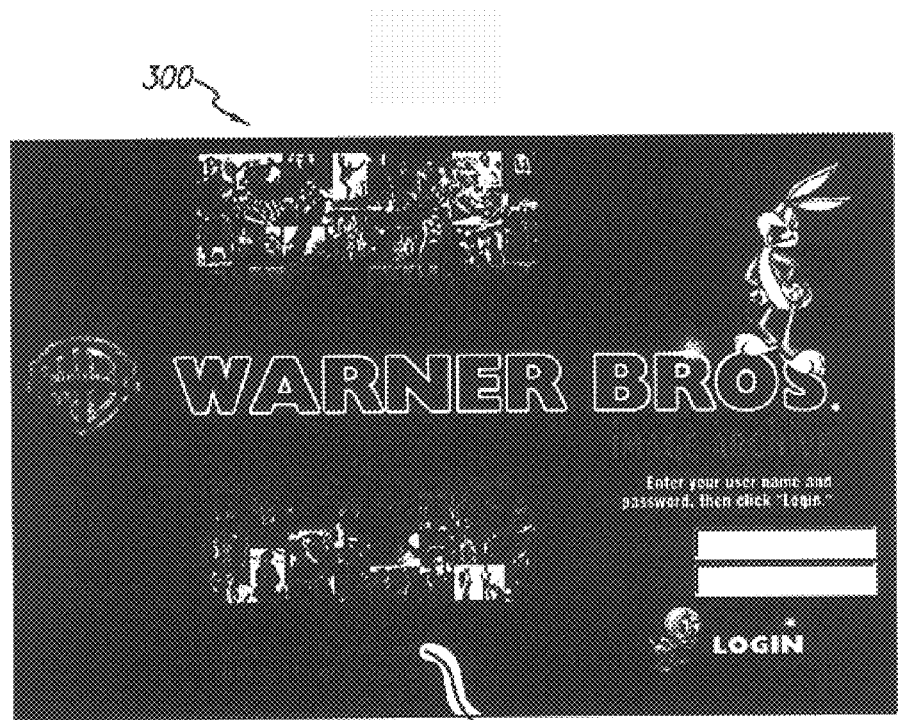
FIG. 3A
FIG. 3B
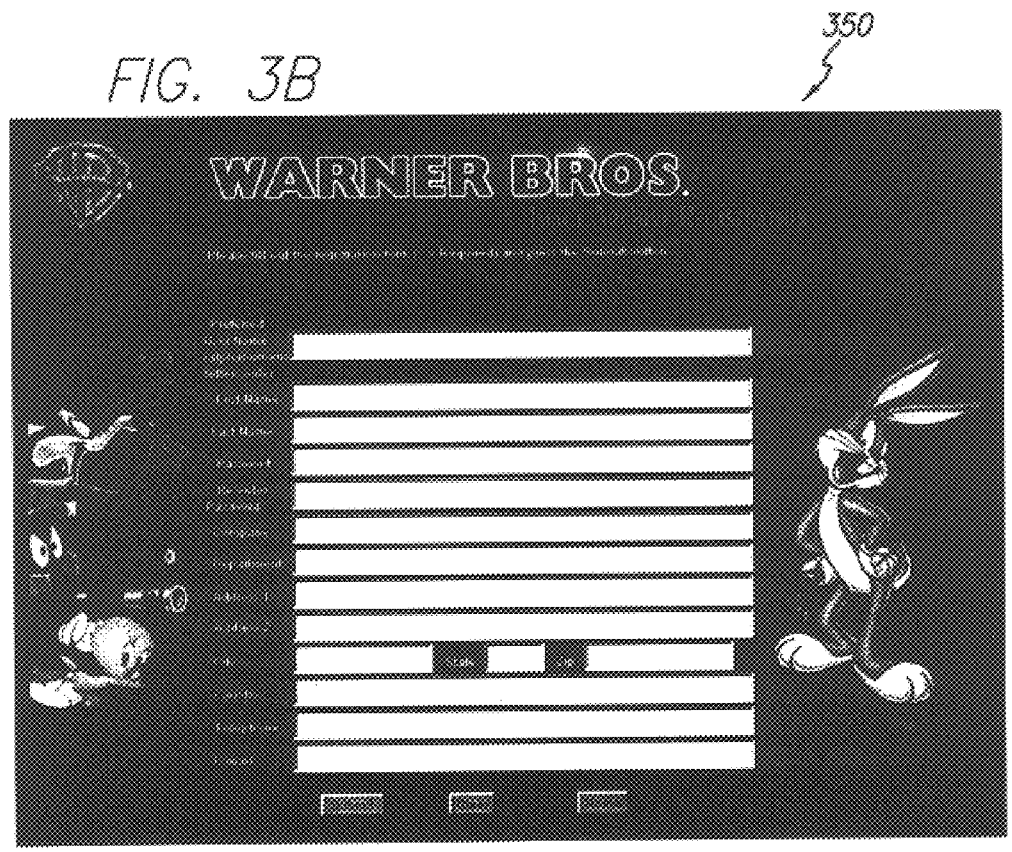

FIG. 9E

METHOD AND APPARATUS FOR ARCHIVING IN AND RETRIEVING IMAGES FROM A DIGITAL IMAGE LIBRARY

COPYRIGHT NOTICE

This patent document contains material subject to copyright protection. The copyright owner, Warner Bros., a Time Warner Entertainment Company, has no objection to the reproduction of this patent document or any related materials, as they appear in the files of the Patent and Trademark Office of the United States or any other country, but otherwise reserves all rights whatsoever.

BACKGROUND OF THE INVENTION

1. Field of the Invention

The present invention relates generally to archival and retrieval of images for computer users, and more particularly, to a storage, retrieval, transmission, and re-creation of images that are of substantially the same quality as the original.

2. Description of Related Art

With the increasing popularity of personal computers and advancements in the telecommunication network technology, many industries have put these new innovations to improve many commercial operations. In the retail merchandising arena, for example, hosts of products such as books, music, electronics, athletic gear, etc. are available for online purchases through the Internet. By effectively utilizing the virtual stores, the merchants streamline the purchasing and delivery process for both the consumer and the retailer. In similar fashion, telecommunication networks make possible for many other industries to conduct business in a more efficient manner. To name just a few examples, other industries taking advantage of the technological innovations of today are financial institutions, travel agencies, and news/media networks. In short, a wide range of industries benefit from the use of computer technology to improve marketing, sale, and distribution of products and information.

In the motion picture and television industry, it is customary for a studio to create a set of "shots" (pictures/images taken from a camera) while filming a movie, show, or event. For a large budget movie, a set of shots may contain up to thirty-thousand images. From this set of shots, the advertising/publicity division selects eighty to one-hundred images to create the "selection set". The images from this selection set is used to promote the movie while the remaining images which were not included in this set are usually physically archived on-site, in a basement or a warehouse on the studio lot without much attention or care. The advertising/publicity division uses the images from this selection set to create posters, newspaper/magazine advertisements, banner ads, etc. to promote the new release of a movie. Thereafter, as the product goes through the distribution chain, every other studio division either utilizes images from the selection set, which the advertising/publicity division created, to conduct their own marketing campaign or attempts to locate a desired image from the originally archived set. For example, the home-video division picks their own images to create the packaging cover of a video cassette release of a movie, the pay-per-view division selects their shots for movie advertisements in the TV Guide™, the merchandising division creates another display of shots for use in poster printings, etc. In such a manner, each division selects their own shots to create suitable composites for each appropriate occasion.

Needless to say, it is very time consuming and extremely difficult to retrieve the original images that were not included in the selection set initially created by the advertising/publicity division, since those remaining images are kept in storage without much attention to detail. The security of those images are compromised and inventory mechanisms are difficult to implement. Over time, many images are lost due to theft and lack of precise inventory control. As a result, the remaining images in the warehouse often suffer from normal damage and deterioration with the passage of time, in addition to losses due to theft and misplacement. In addition, there is the threat of loss due to natural disaster. Since the collection of images is irreplaceable, it is impossible to obtain insurance through any traditional carrier. The loss of these assets would profoundly complicate, if not destroy, a studio's ability to get a product to market. Furthermore, since each division creates and stores their own compositions, without having a centralized archive for their final design layouts, substantial duplicate costs may be incurred for repetitive work across numerous divisions. For each division, as mentioned above, not only is the location and retrieval of a particular image time consuming, it is very difficult, if not impossible, to obtain a comprehensive grasp of how many different and unique shots are available for use at a later time. Without an effective index and search mechanism, it is indeed difficult to accurately gauge how many different images the original, cumulative set contains of a particular film or television show.

While prior art systems have attempted to address the problems described above, they fail to incorporate a high quality asset preservation feature. Previous systems are unable to re-create images that are of substantially the same quality as the original without resorting to the original reference material. Since original reference materials must always be available, previous systems serve primarily as facilitators of the image selection process.

Thus, there is a critical need for an architecture providing high quality preservation, archival, and retrieval capabilities of content (e.g., images) within a secured central system. Furthermore, it would be highly desirable for users to locate, view, retrieve, transmit, order, and re-create content that are of substantially the same quality as the original from this central system.

SUMMARY OF THE INVENTION

The present invention provides a method and apparatus for securely archiving and retrieving images from a digital image library a fast, efficient manner. Along with the goal of protecting a major corporate asset from theft and damage with the passage of time, the present invention provides an economical process whereby users from different divisions may share previously produced images and composites. With such a centralized system of storage and distribution of images, it is possible for users to take advantage of a single, comprehensive catalog/index of all content. Furthermore, the present invention provides an architecture having a design that is scalable and flexible enough to include other asset types (e.g., video and audio) in its content portfolio.

In an embodiment of the invention, a method of providing users with a centralized image processing system entails digitally archiving images and searching for particular images based on content characteristics. Connected via an Intranet, users access the image processing system with a Web-accessible graphical interface. By using pre-defined image content criteria, users are able to locate, select, and retrieve particular images stored in the system database. Once the users have selected the images, they are able to send the images to others for approval or comments, or to fulfillment facilities such as photo labs, graphic houses, or printers to order the re-created images in a specified format.

BRIEF DESCRIPTION OF THE DRAWINGS

FIG. 3A is a sample user login page;

FIG. 3B is a sample user registration page;

FIG. 9E is a sample registration maintenance screen;

DETAILED DESCRIPTION OF THE PREFERRED EMBODIMENT

The present invention satisfies the critical need to provide users from different divisions of a studio with a method and apparatus for securely archiving and retrieving images from a central system. By utilizing ultra-high resolution scanning in the archival process, re-creation of images that are of substantially the same quality as the original is achieved. Ultra-high resolution scanning allows re-creation of images that are photo-quality acceptable for commercial use in magazines, video boxes, movie posters, etc. Medium-resolution scanning, as utilized in prior art systems, while acceptable for Web-publishing, computer display, and the like, they are not of sufficient resolution to reproduce a photo-quality image. Thus, ultra-high scanning allows re-creation of content that are of substantially the same quality as the original. In the detailed description that follows, like element numerals are used to describe like elements illustrated in one or more of the figures.

Figure 1:
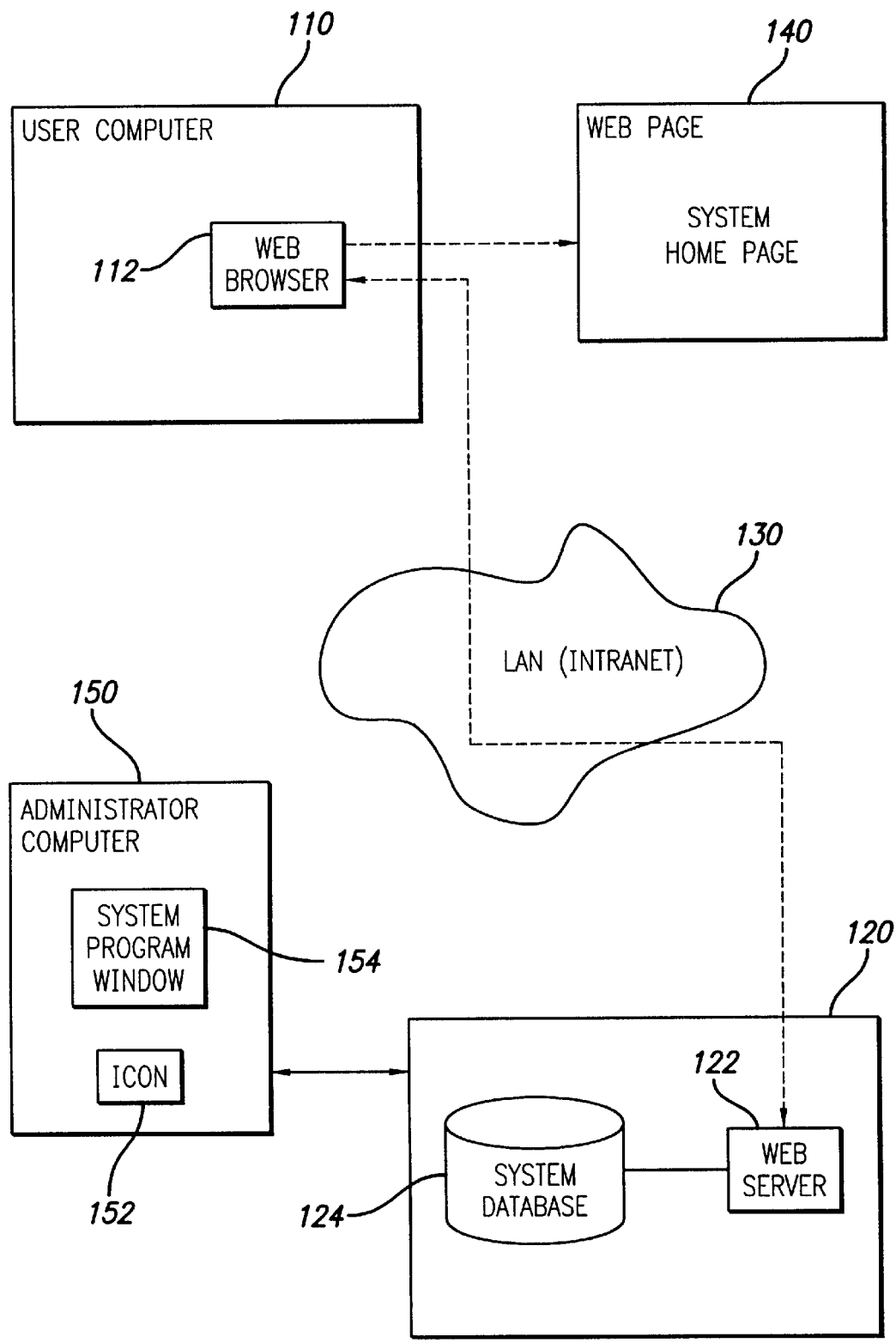
FIG. 1 is a block diagram illustrating the network in which the user, administrator, and image processing system are interconnected in accordance with the invention.

Referring to FIG. 1, a block diagram is illustrated of a local area network (LAN) in which a computer user interacts with a central digital image system in accordance with the invention. It is anticipated that the present digital image system ("System") operate with a plurality of computers which are coupled together on a communications network, such as the Intranet or a LAN. FIG. 1 depicts a network that includes a user computer 110 that communicates with the System 120 through communication links that include the Intranet 130. It should be noted that although the present embodiment of the invention utilizes an Intranet or a LAN as its communications network, the software utilized in the present invention is designed to support Wide Area Access as well. Thus, the use of the Internet or a wide area network (WAN) may also be possible in order to provide access of the System to users outside a particular LAN.

The user computer 110 may be any type of computing device running on any operating system (e.g., Macintosh™, UniX™, Windows 95™, Windows 2000™, etc.) that allows a user to interactively browse websites, such as a personal computer (PC) that includes a Web browser application 112 executing thereon (e.g., Microsoft Internet Explorer™ or Netscape Communicator™). Additionally, it should be appreciated that each user who operates the user computer 110 may be any client to the System—from the divisions of a movie studio (including every advertising/publicity, marketing, advertising, art, graphics, design, sales, affiliate relations, exhibitor relations, and research department), to video retailers, consumer products licensees, studio affiliated television stations, international broadcaster program buyers, graphic artists (creating everything from newspaper ads to billboards to box art to annual reports), historians, and thousands of consumer and trade press throughout the world. The System 120 includes a Web server 122 which delivers graphical data files in the form of HyperText Markup Language (HTML) documents to the user computer 110 using the HyperText Transport Protocol (HTTP). The Web server 122 of the System 120 accesses a store of HTML documents 140 that can be retrieved and viewed at the user computer 110 via the Web browser 112. It should be appreciated that the scalability of the present invention allows many different user computers 110 (in the order of thousands) to communicate with the Web server 122 simultaneously.

As shown in FIG. 1, the administration side of the System 120 includes an administrator computer 150. The administrator computer 150 is linked to the System 120 via a direct server/network connection. It should be appreciated that another embodiment of the invention may utilize a Web based application with either an Intranet or an Internet connection rather than a direct server/network connection for communication between the administrator computer 150 and the System 120. It should also be noted that many different administrator computers 150 may be communicating with the System 120 simultaneously. A specific program which is installed on this computer 150 allows the operator to perform various system administration tasks. By clicking on the icon 152, the operator will launch the program in its own system program window 154. Based on the operating system of the computer 150, the system administration program is as easy to use as a typical word processing application. Another important aspect to note concerning the administrator computer 150 is that, as long as the administrator computer has access to the Intranet 130 on which the user computers 110 are linked, the administrator computer 150 also has access to the System 120 from the user's end as well. Thus, with an Intranet 130 connection, administrator computers 150 will serve dual purposes—a point of access to the System 120 from the administration end as well as from the user end.

Attributable to the unique design of the database 124, copies of both database and ASCII copies as well as backups may be routinely made from multiple locations. Thus, the database 124 can be recovered from within the datacenter if only the database server is affected. In the event that the datacenter is compromised, then the database may be re-created remotely. Furthermore, the present invention provides an architecture having a design that is scalable and flexible enough so that the database 124 may include asset types other than still images such as video and audio in its content portfolio.

Since the database 124 stores and maintains such a significant corporate asset (i.e., portfolio of a studio's images of high-resolution format in its digital tape library), it is necessary to implement and assign a set of established system access rights to each individual. Consisting of different levels of access, these rights are grouped into various functional categories. For example, administrator rights govern system administration functions, cataloger rights control image cataloging activities, scanner rights relate to image scanning tasks, circulation rights dictate image circulation functions, and preview rights enable image preview capabilities. Access rights are specifically tailored to each user and administrator so that each person may accomplish the required tasks without having unnecessarily broad access to the System 120.

Administrator rights govern system administration functions such as adding new users to the System 120. An example of the various levels of administrator rights is illustrated Table 1 as follows:

TABLE 1

| Administrator Level | Associated Rights |
| --- | --- |
| 0 | No administrator rights enabled. |
| 2 | Enable rights to add/edit MEDIA CODES, MEDIUM/OUTPUT CODES, INITIAL USE |
| 4 | Enable rights to execute bulk replace/purges. |
| 6 | Enable rights to edit the LEGAL RESTRICTIONS field and to add/edit the SOURCES and COPYRIGHT tables. |
| 8 | Enable rights to add/edit the USERS and REGISTRATION tables and approve/deny new users. |

Cataloger rights enable a person to add, edit, and delete cataloging information which describe each image contained in the system database 124. An example of the various levels of cataloger rights is illustrated in Table 2 as follows:

TABLE 2

| Cataloger Level | Associated Rights |
| --- | --- |
| 0 | No cataloger rights enabled. |
| 2 | Enable rights to add/edit all data/fields on the cataloging screen except cannot add/edit TITLES/SUBTITLES (and all associated fields, such as EPISODE NUMBER), CROSS REFERENCES, PERSONALITIES, PHOTOGRAPHERS, or DIRECTORS tables/fields. |
| 4 | Enable right to add/edit the TITLES/SUBTITLES (and all associated fields such as EPISODE NUMBER), CROSS REFERENCES, PERSONALITIES, PHOTOGRAPHERS, and DIRECTORS tables/fields. |
| 6 | Enable rights to replace/purge the viewed image. (This right allows for single replace/purge executions by the cataloger). |
| 8 | Enable rights to set approval flags on the TITLES/SUBTITLES, CROSS REFERENCES, PERSONALITIES, PHOTOGRAPHERS, and DIRECTORS tables. |

Scanner rights enable a person to scan and load images onto the system database 124. An example of the scanner level rights is illustrated in Table 3 as follows:

TABLE 3

| Scanner Level | Associated Rights |
| --- | --- |
| 0 | No scan rights enabled. |
| 2 | Enable rights to pre-catalog and upload images. |

Circulation rights enable a person to transmit images to another. An example of the circulation level rights is illustrated in Table 4 as follows:

TABLE 4

| Circulation Level | Associated Rights |
| --- | --- |
| 0 | No circulation rights enabled except enable rights to perform all lightbox operations, including create, delete, add to, send, and order. |
| 2 | Enable rights to view orders (both intranet and administration). |
| 4 | Enable rights to view all orders and fulfill those marked REVIEWED and above (meaning cannot fulfill SUBMITTED orders). |
| 6 | Enable rights to view and edit orders with any status. |

Preview rights enable a person to preview the searched images before sending to another or ordering from the fulfillment department. An example of the preview level rights is illustrated in Table 5 as follows:

TABLE 5

| Preview Level | Associated Rights |
| --- | --- |
| 0 | No medium-resolution rights enabled - thumbnail-only viewing capability. |
| 2 | Enable rights to view medium-resolution watermarked images. |
| 4 | Enable rights to view medium-resolution images without a watermark. |
| 6 | Enable rights to download high-resolution images. |

It should be noted that the above assignment of rights is exemplary of system access rights available for users/administrators and should not be taken in a limiting sense. In addition, a typical "default" user (rights accorded to a new user upon registration) would have an Administrator Right= 0, Cataloger Right=0, Scan Right=0, Circulation Right=0, and Preview Right=2. After formal review, the user may be granted higher system access rights.

Figure 2A:
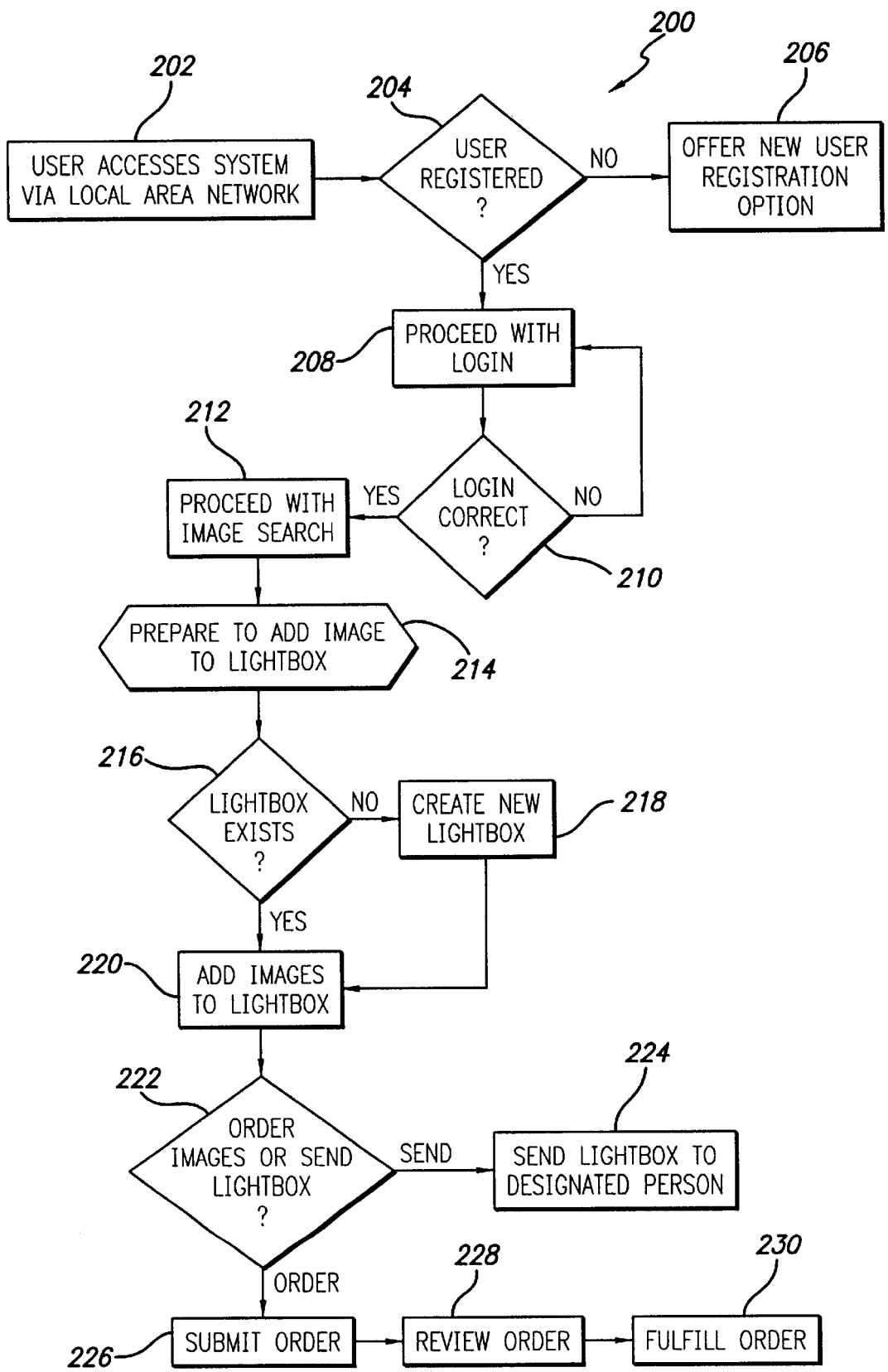
FIG. 2A is a flow chart outlining system processes from the user's end.

To illustrate the process of the System 120, FIG. 2A shows a flow chart 200 outlining the steps from the user's end. Initially, at step 202, the user accesses the System 120 through a LAN such as an Intranet. At step 204, a system login page 300 such as the one depicted in FIG. 3A will appear for the user. The system login page 300 will also contain a new user registration option 302 for those who have not previously registered to use the System 120 at step 206. If a new user decides to register to use the System 120, the user will be asked to complete a registration form 350 online, such as the one depicted in FIG. 3B, by providing information such as their first and last names, preferred user identification (ID) and password, company name and address, and telephone and e-mail information. While the billing information is collected and handled on a case-by-case basis in the present embodiment of the invention, it should be appreciated that numerous billing arrangement options exist for other embodiments. For example, in corporate accounts, users may have prepaid credits to apply towards future purchases of digital images. Other forms of billing arrangements may be made, in which the corporate account users have a contract to use the System 120 and pay for ordered images on a monthly basis, like a standard telephone account. After the registration process has been completed, the user will have a unique user ID along with a password to access and use the System 120.

Registered users will be able to enter their respective assigned user ID and password to proceed with the login process at step 208. Once the user ID and password is verified at step 210, the user will gain access to the System 120. Otherwise, if the login information is incorrect, the user will be repetitively asked to enter the login information at step 208 until the correct login information is received. After the login process is complete, the System 120 will move to step 212 where the user will be able to search for images contained in the System 120.

Figure 4A:
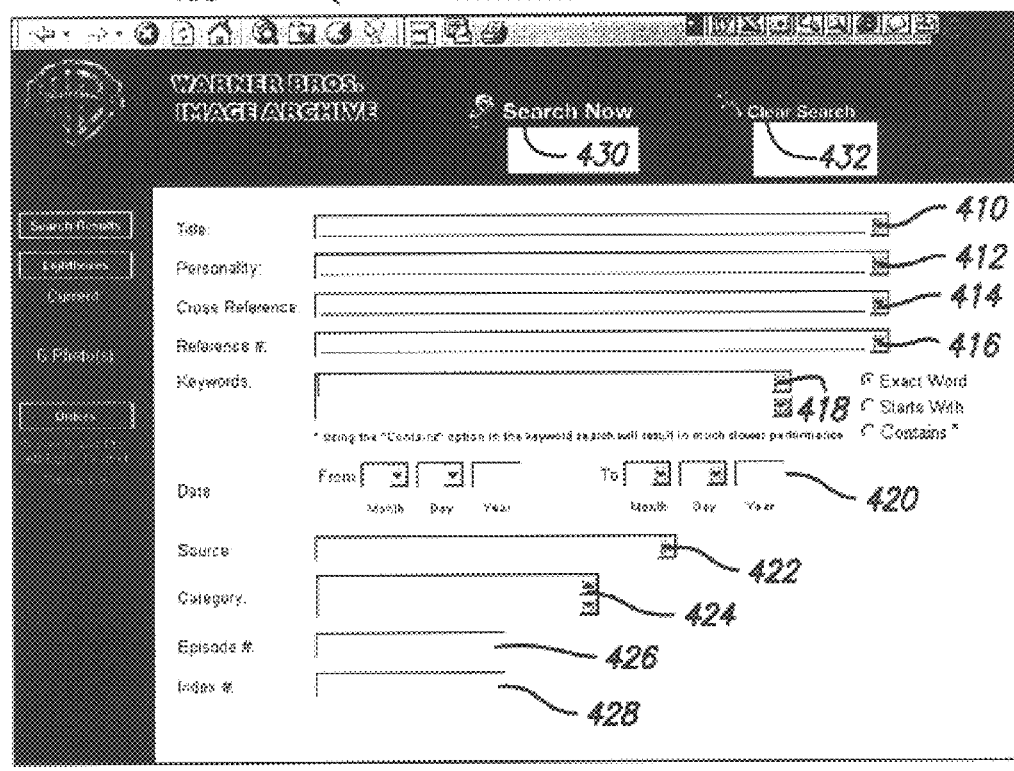
FIG. 4A is a sample image search page (blank)
Figure 4B:
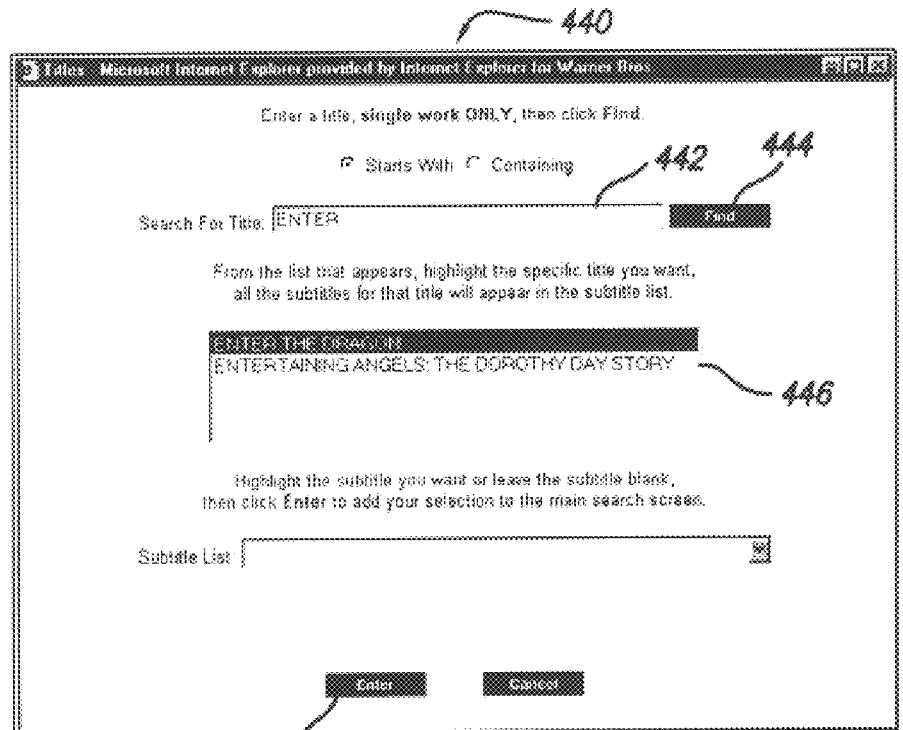
FIG. 4B is a sample title search page.

Every search for an image starts at a Search Page 400, such as the one shown in FIG. 4A. A typical Search Page 400 contains the various fields describing/characterizing each image. The fields which help identify a particular image or a set of images may include the Title 410 of a movie or show, the Personality 412 (i.e., name of an actor/actress), Cross Reference 414 (i.e., a particular studio division's reference to a set of images), or Reference Number 416 (i.e., a particular studio division's reference number to an image). By using these different fields within the Search Page 400, a user may search the system database 124 to locate and retrieve the desired image(s). In addition, other fields associated with an image include Date of Release 420 (i.e., date the image was released), Source 422 (i.e., source to which the image belongs, e.g., Feature Films), Category 424 (i.e., a set to which the image belongs, e.g., color selection), Episode Number 426 (i.e., an episode within a particular TV season), and Index Number 428 (i.e., a unique number assigned to each image by the System 120). For example, assuming that the user wishes to find images from the movie "Enter the Dragon" starring Bruce Lee. As the user clicks on the pull-down menu next to the Title 410 field, a Title Search window 440 such as the one shown in FIG. 4B will appear on the user computer 110. After typing in a part of or all of the movie title in the Search For Title area 442 and clicking on the Find button 444, the user will see a list of all movies, shows, events, etc. that begin with what was entered in the Search For Title area 442. The list of titles that appear in window 446 may contain more than one movie or show.

Figure 4C:
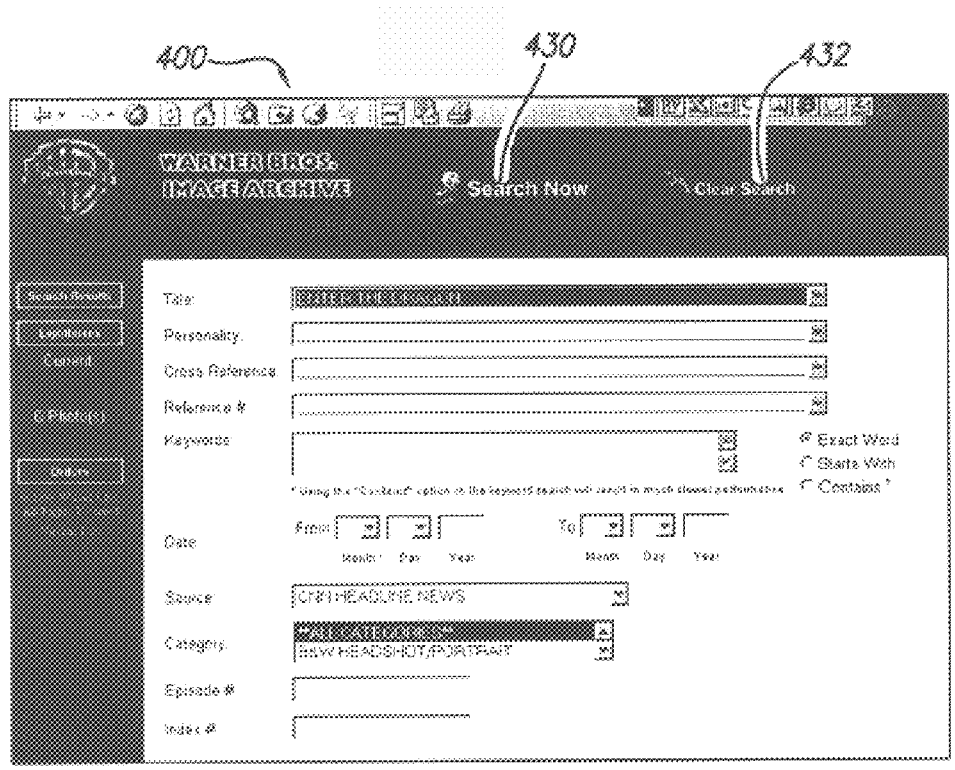
FIG. 4C is a sample image search page (title filled in)

For example, if the user provides "Enter" in the name search window 440, then the list that appears in window 446 will contain both "Enter the Dragon" and "Entertaining Angels: The Dorothy Day Story". Therefore, the user will choose "Enter the Dragon" by highlighting that title and proceed with the search by clicking on the Enter button 448. The user will then be brought back to the Search Page 400, but now, the Title field 410 will contain "Enter the Dragon", as shown in FIG. 4C. The user may complete the other fields of the Search Page 400 in order to narrow the set of images from the movie "Enter the Dragon" or begin the search only with the title field being completed to retrieve all images from that particular movie. By completing the other fields, the System 120 allows a user to refine the existing search beyond mere keyword or single category searching. Conventional keyword searches are notoriously ambiguous and provide no real ability to refine a search. The search engine utilized in the current invention, therefore, allows a user to refine a search to yield effective results. Furthermore, it should be appreciated that while the present embodiment of the invention utilizes pull-down menus with pre-established tables for selecting the Title, Personality, etc., in other embodiments, it is possible to have the user type in the partial or complete names.

Once the user clicks on the Search Now button 430 on the Search Page 400, the System 120 will retrieve all images within the database 124 which pertain to all the descriptions contained in the fields completed by the user in the Search Page 400. In the current example, since no other field except the Title field 410 was completed, the System retrieves all images containing scenes or shots from the movie "Enter the Dragon". The System 120 employs a very focused use of Partitioning, Indexing, Join methods and SQL extensions. This design improves query performance by minimizing the amount of information that must be read and manipulated to process queries. The concentration of this is seamless to the application and concentrates on the internal processing. An added benefit is that the failure of one partition will not affect processing in other partitions.

The database 124 makes use of Hybrid partitioning and allows segmentation of the partitioning algorithms. This minimizes "Skew" in the searching and adds greatly to the performance. The system uses multiple B-tree indexes for a single table. This reduces the number of rows scanned, which is a particular advantage as row sizes approach 15 million and beyond, as in this case. This becomes very useful with queries using OR and NOT conditions. In addition, the database 124 uses seven extensions to SQL, This reduces the complexity and improves the performance.

Figure 5A:
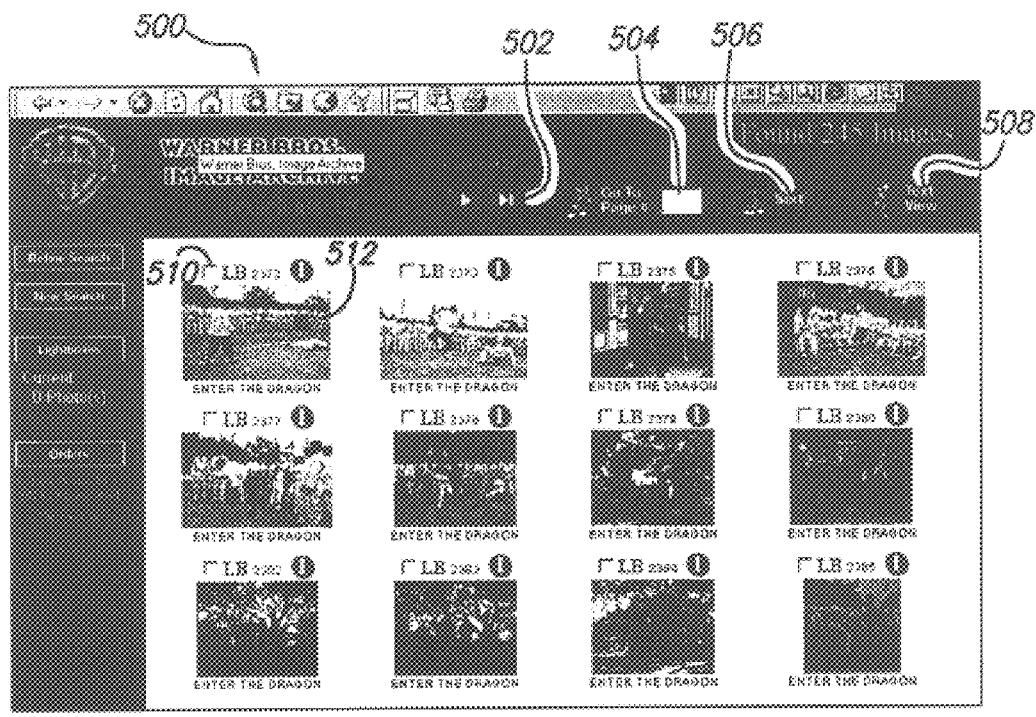
FIG. 5A is a sample search results page in image view.
Figure 5B:
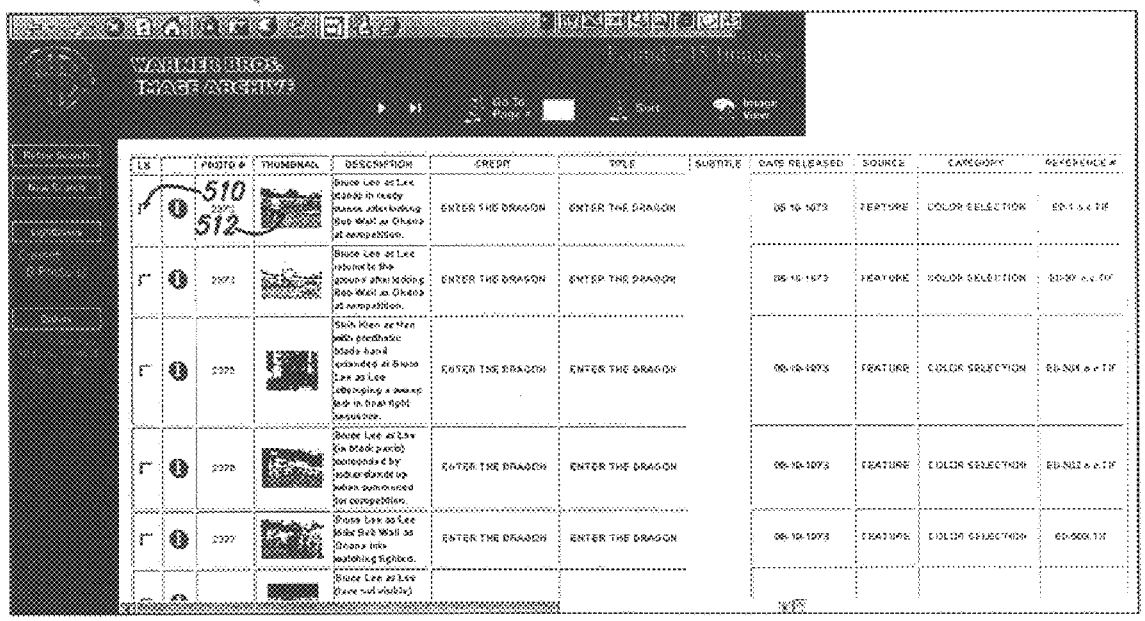
FIG. 5B is a sample search results page in text view.

As seen in FIG. 5A, the Search Results Page in Image View 500 contains a set of reduced size images 512 (referred to as "thumbnails") which depict scenes or shots from the movie "Enter the Dragon". These thumbnails are stored in the database 124 in JPEG format. The user may scroll through the retrieved set of thumbnail images by clicking on the navigation arrows 502 or may jump to a particular page of the search results by using the Go To Page Function 504. Sorting the thumbnail images by index number, ascending or descending date of release of image, alphabetical order by title, etc. is also available by clicking on the Sort button 506. In addition, the user may choose to see the Search Results Page in Text View 550 by clicking on the Text View button 508. The Text View 550 format is illustrated in FIG. 5B and shows the thumbnail images along with the descriptions/characteristics of each image such as text description, credit and title, date of release, source, category, reference number, etc.

Figure 5C:
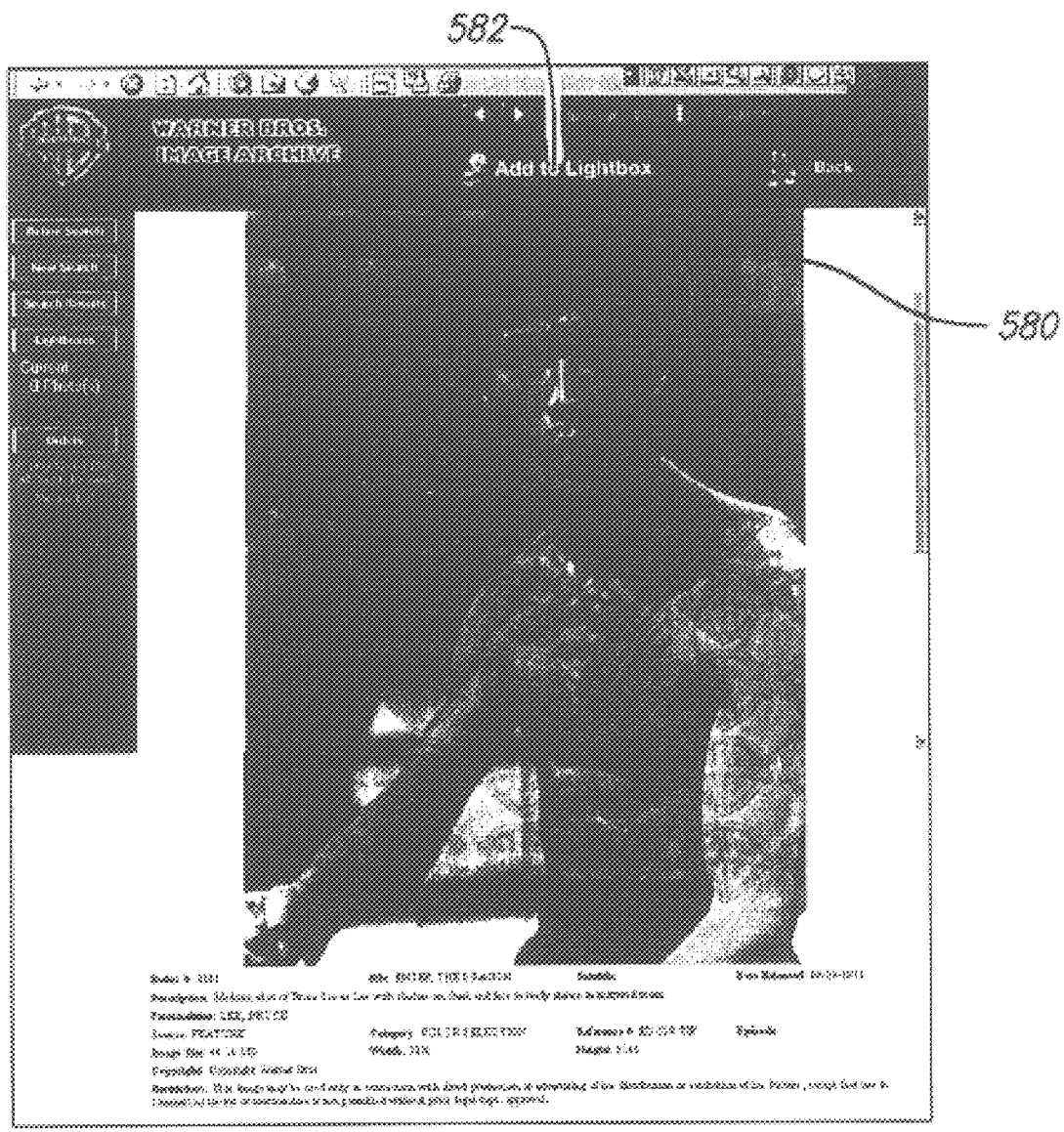
FIG. 5C is a sample image in medium-resolution view.

To get a more detailed view of an image, the user may click on the thumbnail image in either Image View 500 or Text View 550 to see the image in a medium-resolution format. Like the thumbnails, the medium-resolution images are also stored in the database 124 in JPEG format. Depending on the user's preview rights (determined from the initial set of user rights as described previously), the user will be able to see the medium-resolution image with or without a security watermark. The security watermark is never contained in the image itself; rather, the System 120 will check a particular user's preview rights immediately before displaying the image in medium-resolution format and affix the watermark if necessary in real-time as the image is displayed on the user computer 110. In this manner, the storage of duplicate images, one with a watermark and one without a watermark, is not necessary. An example of a medium-resolution image 580 with a security watermark is given in FIG. 5C.

Referring back to FIG. 2A, at step 214, the System 120 prepares to add the selected image to a lightbox. A lightbox may be thought of as the photography industry's equivalent to a shopping cart in the retail industry. In more simple terms, it is a folder which holds selected images and includes a text field for notes between users who transmit this folder to each other. At a point when a user desires to work with a particular image (i.e., for transmission to another user or for ordering the image itself), the user must first place the selected image into a lightbox. At step 216, the System will check to see if any previously created lightboxes exist and ask the user to create a new lightbox at step 218 if no lightboxes were previously created. After the user creates a new lightbox or designates a previously existing lightbox, the user may place the desired images from the Search Results Page (Image View 500 or Text View 550) onto the designated lightbox by "checking" the LB box 510 which appears either above each thumbnail image 512 in FIG. 5A or next to each thumbnail image 512 in FIG. 5B. The user may also place the desired image into the designated lightbox while viewing the medium-resolution format 580 by clicking on the Add to Lightbox button 582 in FIG. 5C. The user thus chooses which images should be placed into a particular lightbox at step 220.

Once the user places the desired images in a particular lightbox at step 220, the user has two options—(1) send the lightbox 224 along with its contents to others for approval or comments, or (2) submit the order 226 online to a fulfillment department or direct downloading of high-resolution images. It is important to note that the lightbox 224 may be sent to anyone via the Internet, including those who are not necessarily registered users of the System 120. As such, exchange of image among many different people involved in a particular design project, for example, is quite easily accomplished. Furthermore, fulfillment departments such as a photo labs, graphic houses, and printers may complete an order for images in a variety formats, including transparencies (from 35 mm to 8×10 to 12' murals), prints (both in color and in B&W), CD-ROMs for Macintosh™ and PC platforms, ZIP™ disks, JAZZ™ disks, any electronic mail formats, and File Transfer Protocol (FTP).

Since the images were digitally archived, re-created images are of substantially the same quality as the originals. Downloading of images in high-resolution format directly to the user's computer would be a right reserved for users with the highest level of system access rights. An ultra-high resolution image of a typical 8×10 photograph contains about 50 MB of graphical data in a tagged image format. Most users with the average set of system rights will be able to submit their order to the fulfillment department for ordering of the images in the desired formats. At the time of such an order, the user will provide information such as the preferred media for the images, the intended purpose for ordering the images, the shipping and billing information, etc. that are necessary to fulfill an order. The fulfillment department will then review the order 228 and conduct a clearance check to verify that the images may be used for the user's intended purposes. After the clearance check, the fulfillment department will then process the orders 230 according to the user's request. A feature of the present invention keeps users informed about their orders. When an order is placed with a fulfillment department, the user may track the status of the order in real-time. Users may therefore check, in real-time, whether their orders have been submitted, approved, denied, or fulfilled.

Figure 2B:
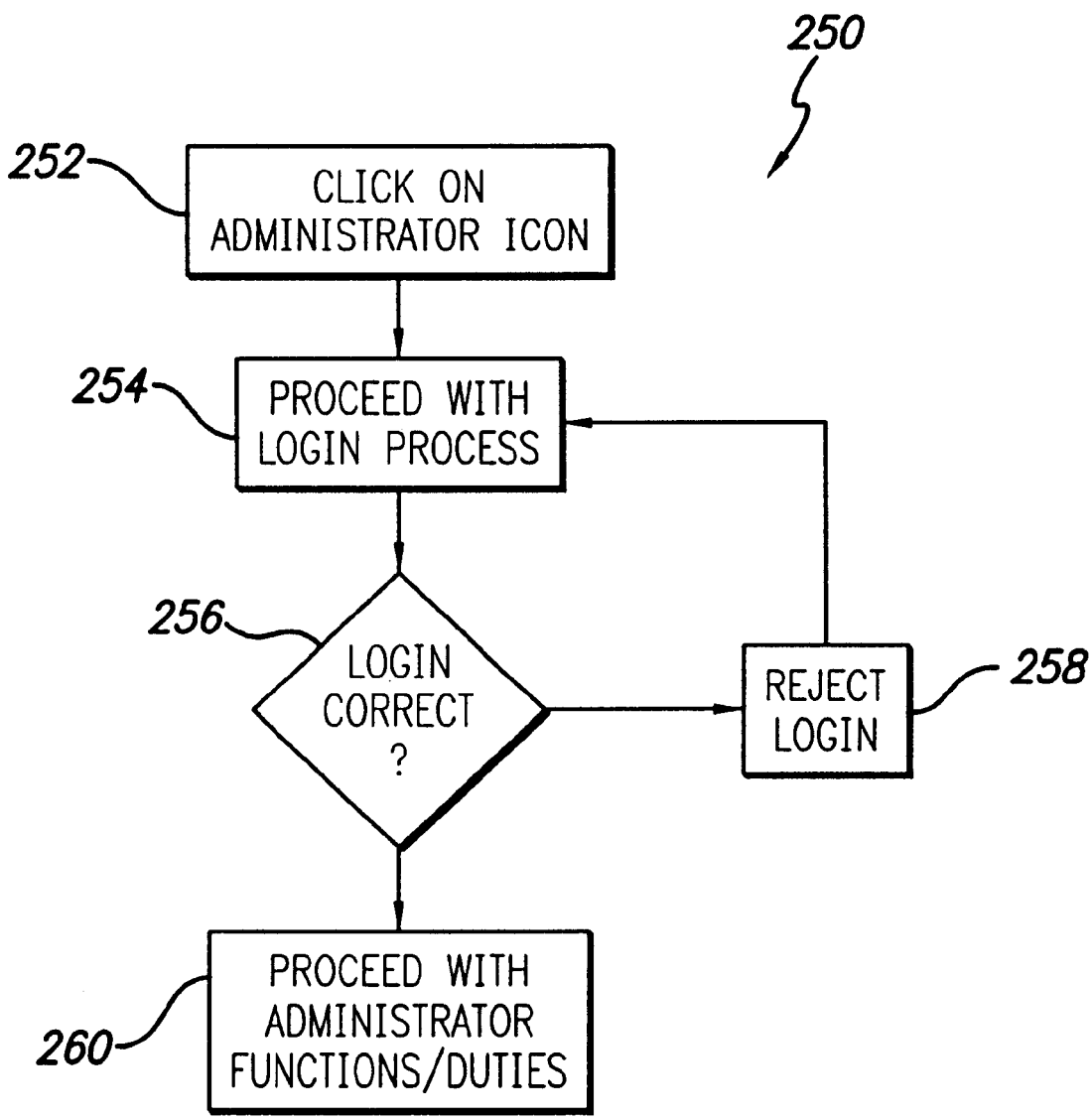
FIG. 2B is a flow chart outlining system processes from the administrator's end.
Figure 6:
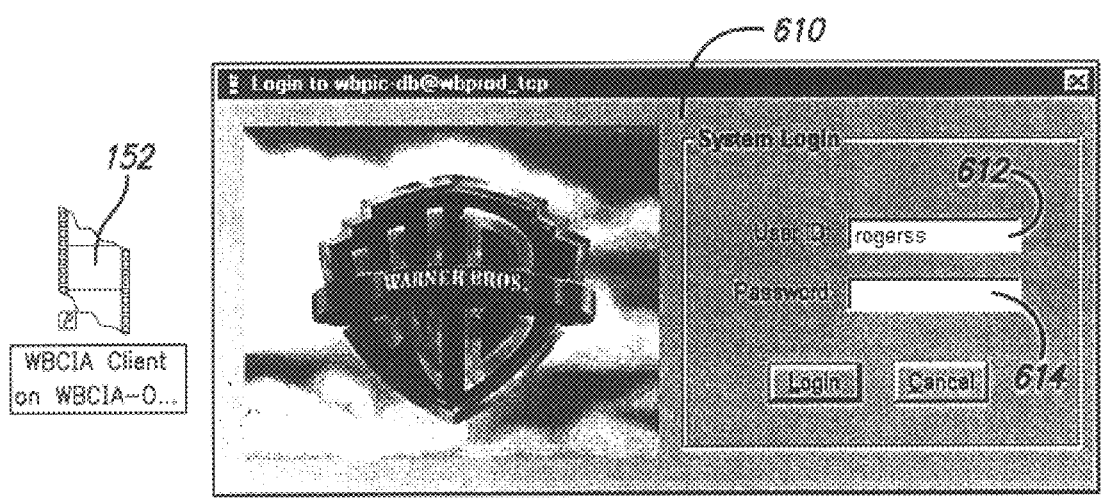
FIG. 6 is a sample administrator login page.

Now referring to FIG. 2B, details of the System 120 from the administration end will be given. First, at step 252, those with administration rights will have an icon 152 on the administrator computer 154, as shown in FIG. 6. Once the administrator double clicks on the icon 152, an Administrator Login screen 610 will appear on the administrator computer 150. The user will then enter the user ID 612 and the assigned password 614 to proceed with the login process 254. Once the user Id and password is verified at step 256, the administrator will gain access to the System 120. Otherwise, if the login information is incorrect, the system will reject the login attempt at step 258 and will repetitively ask for the correct login information. After the login process is complete, the System 120 will move to step 260 where the administrator will be able to proceed with the various administrator functions/duties at step 260.

Figure 7:
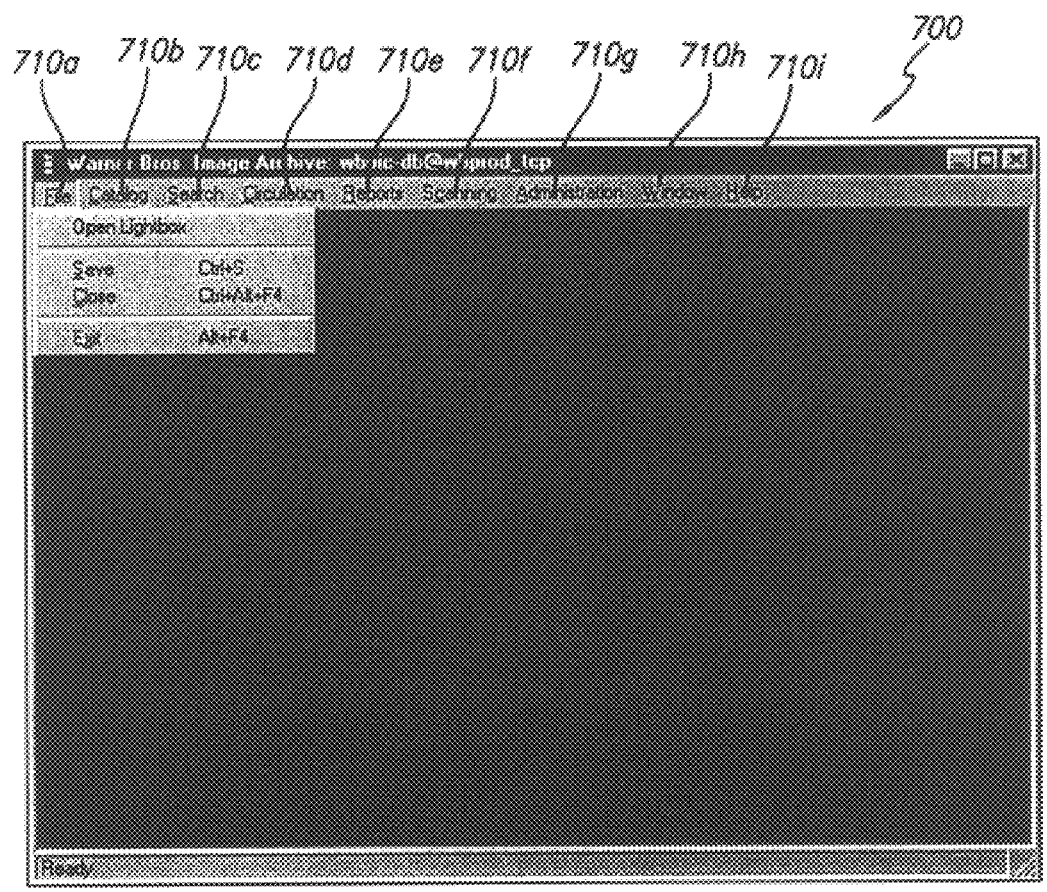
FIG. 7 is a sample administrator program window.

Upon access to the System 120, the administrator will begin with a system administration window 700 such as the one shown in FIG. 7. By using the pull-down administration buttons 710a–710i, the administrator will perform the desired tasks. Using the File button 710a, an administrator may access a particular lightbox. Depending on the level of rights that a particular administrator may possess, that administrator may access not only his or her own lightboxes, but also other users' lightboxes as well. Once the administrator accesses a particular lightbox, the administrator may perform a host of functions, including, but not limited to, sending the lightbox to another user, administrator, or any other person via the Internet, viewing the contents of that lightbox, adding/removing images to and from that lightbox, deleting that lightbox along with its contents, etc. The administrator, like the user, may also retrieve and view a particular image from the system database 124. The Catalog button 710b allows the administrator to enter the specific index number of a desired image and view that single image from the system database 124.

In the event that the administrator wishes to search the System for a certain images, the administrator may do so using the Search button 710c. Two types of searches are available for the administrator—a basic and an advanced search. With the basic search, the administrator may enter the Index Number, Title and Subtitle, Reference Number, Source, Category, and Release Dates of the images. With the advanced search feature, the administrator may search for images with part of or all of the information pertaining to Personality, Cross Reference, Release Date, Reference Number, Director, Photographer, Index Number, etc. Thus, in the advanced search mode, the administrator may attempt to search for all images with a name of the personality starting with "Han". In this particular case, a table of personalities will be provided and will include all the names of the personalities contained in the system database 124 that begin with the string of characters equivalent to "Han". This search with "Han" will yield a list of two names— "Hanks, Tom" and "Hannah, Daryl", for example. From this list, the administrator may select the appropriate personality. Similar searches are available in the advanced search mode with the other descriptors as listed above. Once the search is complete, the administrator will be able to view the images in a thumbnail format in the Frame View mode, similar to the user as described above. In addition, the Text View format that displays only the index numbers of the retrieved images and the search criteria used to locate those images, is also available to the administrator.

Figure 8A:
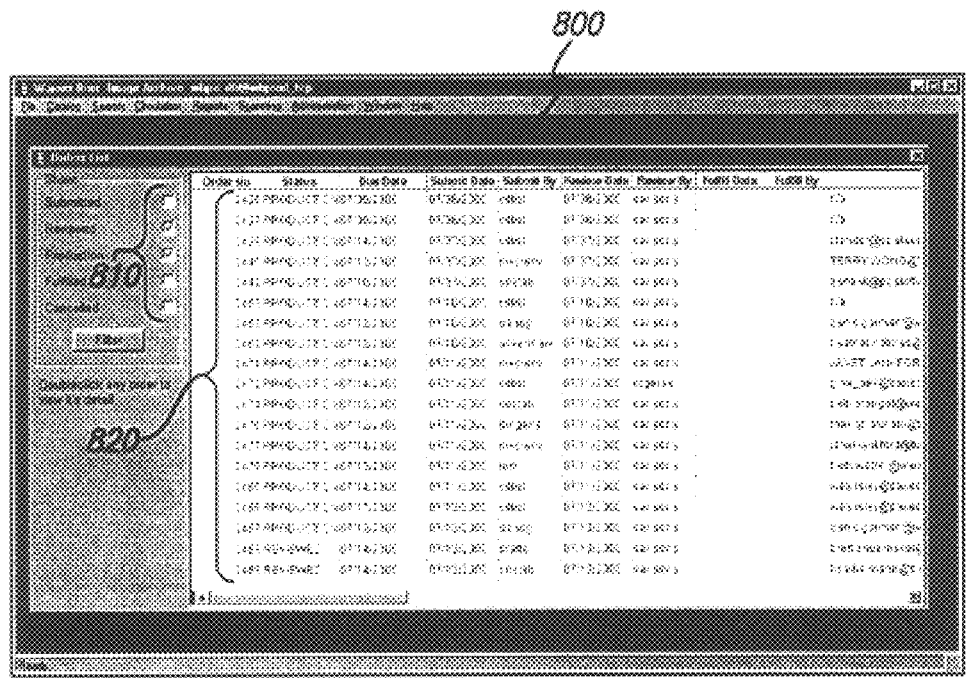
FIG. 8A is a sample orders list.
Figure 8B:
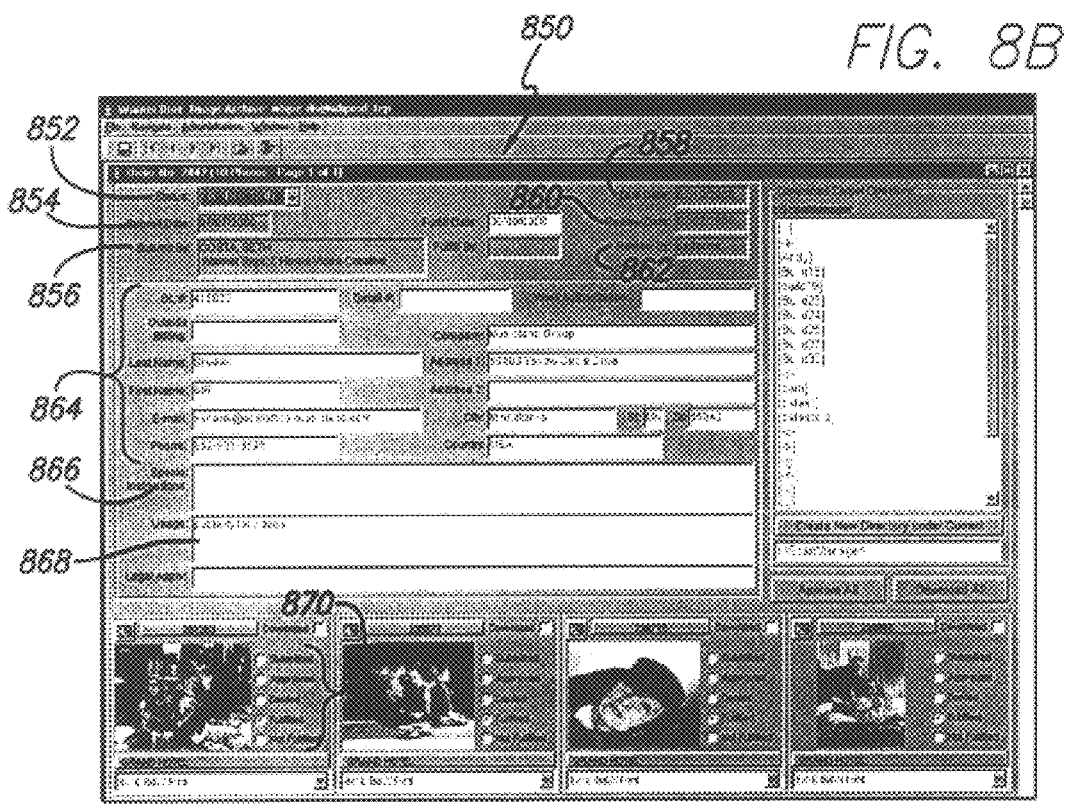
FIG. 8B is a sample order information screen.

One of the most important duties of an administrator is the review of pending orders. By clicking on the Circulation button 710d, the administrator is able to view all of the pending orders that the users have submitted for fulfillment. A sample Orders Page 800 is shown in FIG. 8A. By checking off the appropriate criteria 810, the administrator may filter which particular orders should be displayed. For example, by checking the criteria of "Reviewed" and "Production", the administrator will view only those orders which have been reviewed for copyright and security clearance and are now in production for fulfillment according to the user's request. The list of orders 820 which fit the criteria of having been "Reviewed" and currently in the "Production" stage of the fulfillment process appears in the Orders Page 800. By clicking on a particular order, the administrator is taken to the Order Information Screen 850, such as the one shown in FIG. 8B. The Order Information Screen 850 contains information concerning the current Status 852, Submit Date 854, Submit By 856, Due Date 858, Review Date 860, and Reviewed By 862. In addition, the Order Information Screen 850 contains the contact and billing information 864, any Special Instructions 866 concerning fulfillment, and the intended Usage 868 submitted by the user. Most importantly, the administrator has the ability to approve or disapprove the fulfillment of a particular image by using the buttons 870 appearing next to each image on the Order Information Screen 850. In this manner, an administrator from the rights and clearances division may review and approve/disapprove the use of certain images. Thus, the System 120 facilitates legal protection of copyrights regarding personal image use of the subject talents. A particular talent's rights for an image continues to be protected in perpetuity.

Another important function for the administrator is the maintenance of the identifying information associated with each image. For example, the administrator needs to maintain uniformity of all the information entered in conjunction with each image, such as the Title, Source, Photographer, Director, Personality, Cross References, etc. Since these characteristics describe each image, it is important that images pertaining to a particular talent, for example, have the same Personality information. In the case of Tom Hanks, all images containing that actor must have the Personality field with "Hanks, Tom" and not "Hanks, Thomas". Therefore, the administrator utilizes the Administration button 710g to appropriately manage, edit, add, and delete all the characteristics (Title, Source, Photographer, Director, Personality, Cross References, etc.) associated with the images.

Figure 9A:
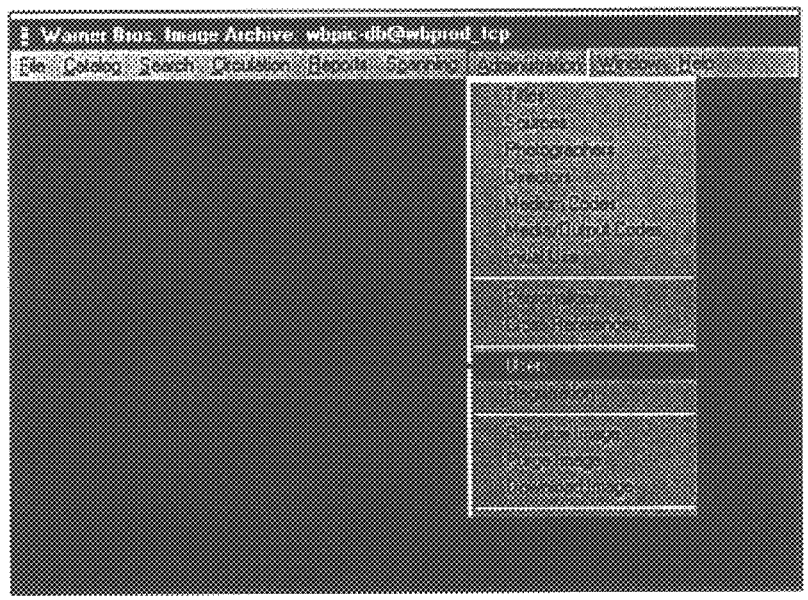
FIG. 9A is a sample administrator program window highlighting administration tasks.
Figure 9B:
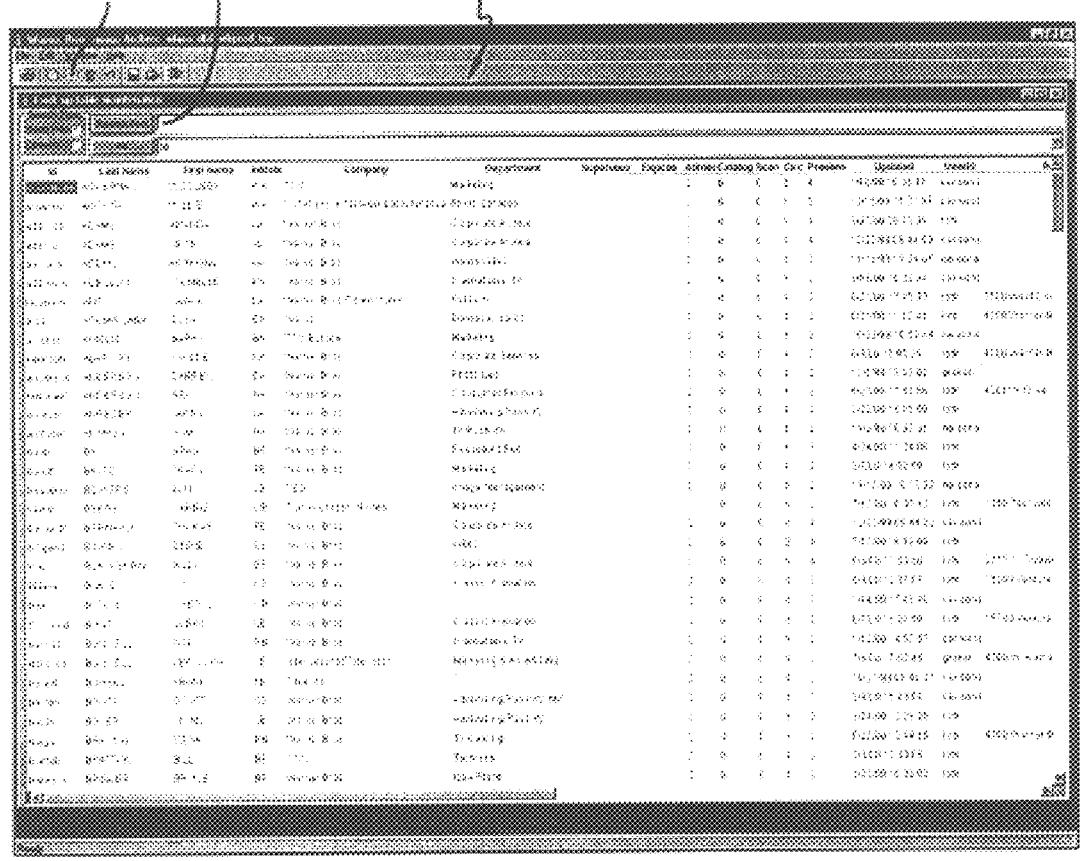
FIG. 9B is a sample user maintenance screen.
Figures 9C, 9D:
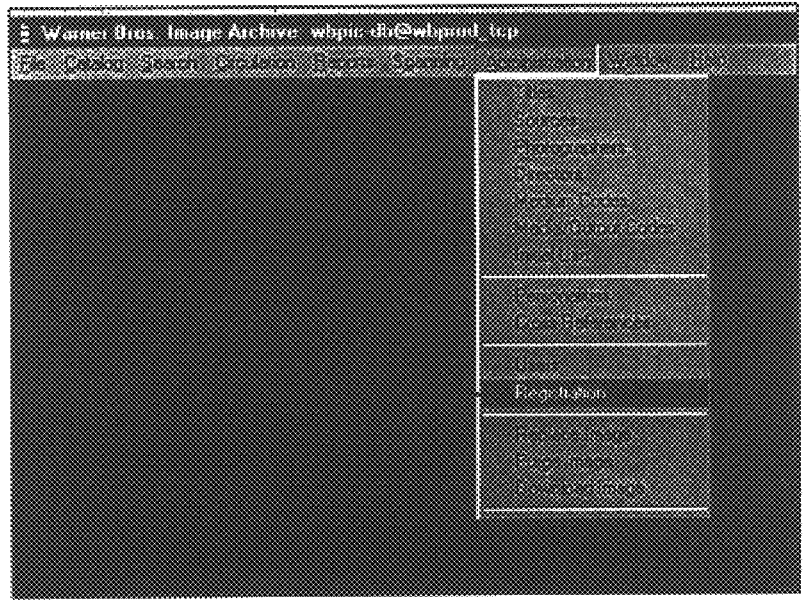
FIG. 9C is a sample user rights add/edit screen.
FIG. 9D is a sample administrator program window highlighting administration tasks (registration)
Figure 9E:
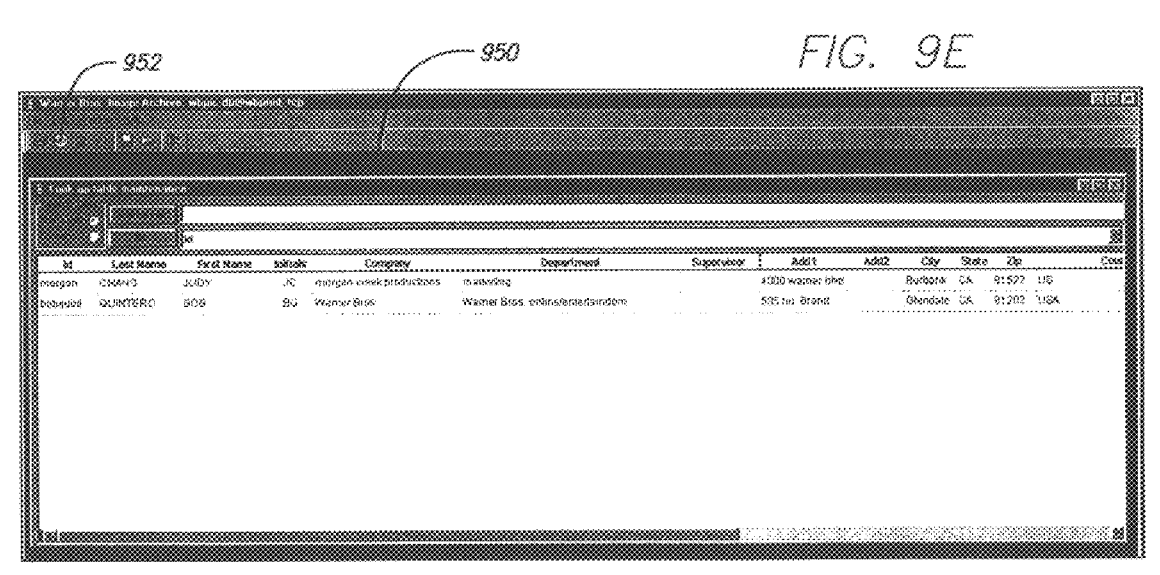

In addition to managing the fields associated with the images, the administrator has the task of registering new users to the System 120 and assigning appropriate access rights to the newly registered users, as well as assigning a higher or lower set of access rights to previously registered users. Once again, by clicking on the Administration button 710g and choosing the Users choice 910 as depicted in FIG. 9A, the administrator accesses the Users Maintenance Screen 920 of FIG. 9B. From this Users Maintenance Screen 920, the administrator may click the Edit button 922 to add or edit users and may also search for a particular user from the database using the Search For field 924 of the screen. By accessing the User Add/Edit Window 930 of FIG. 9C, the administrator may edit a particular user's access rights by assigning a higher or lower set of rights using the Access Rights window 932. In order to register new users to the System 120, the administrator clicks on the Administration button 710g and chooses the Registration choice 940 as depicted in FIG. 9D. The administrator accesses the Registration Maintenance Screen 950 of FIG. 9E to add a newly registered user to the System. Once again, by clicking on the Edit button 952 of the Registration Maintenance Screen 950, the administrator accesses the User/Add Edit Window 930 of FIG. 3C. In this case, instead of updating a previously registered user's set of access rights, the administrator assigns an initial set of access rights to the new user.

Figure 9F:
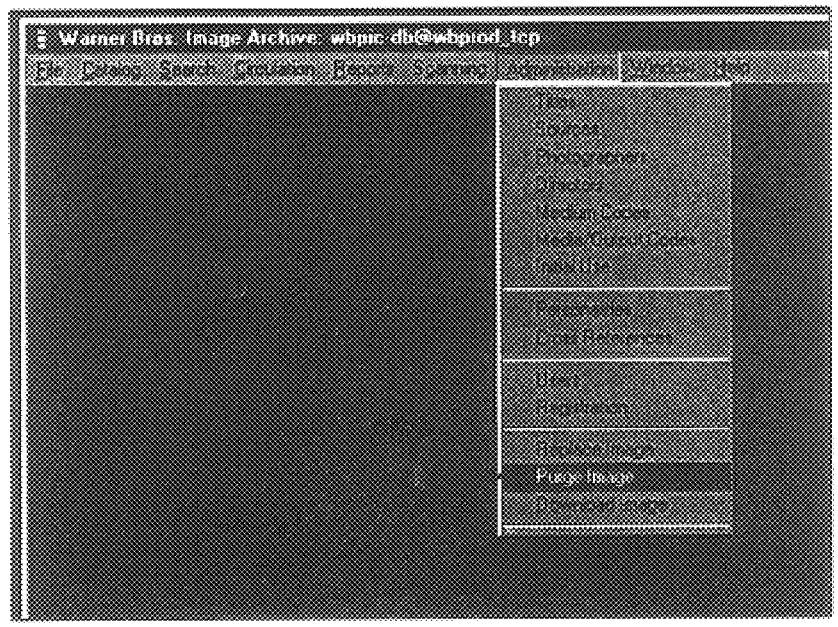
FIG. 9F is a sample administrator program window highlighting administration tasks (purge image)
Figure 9G:
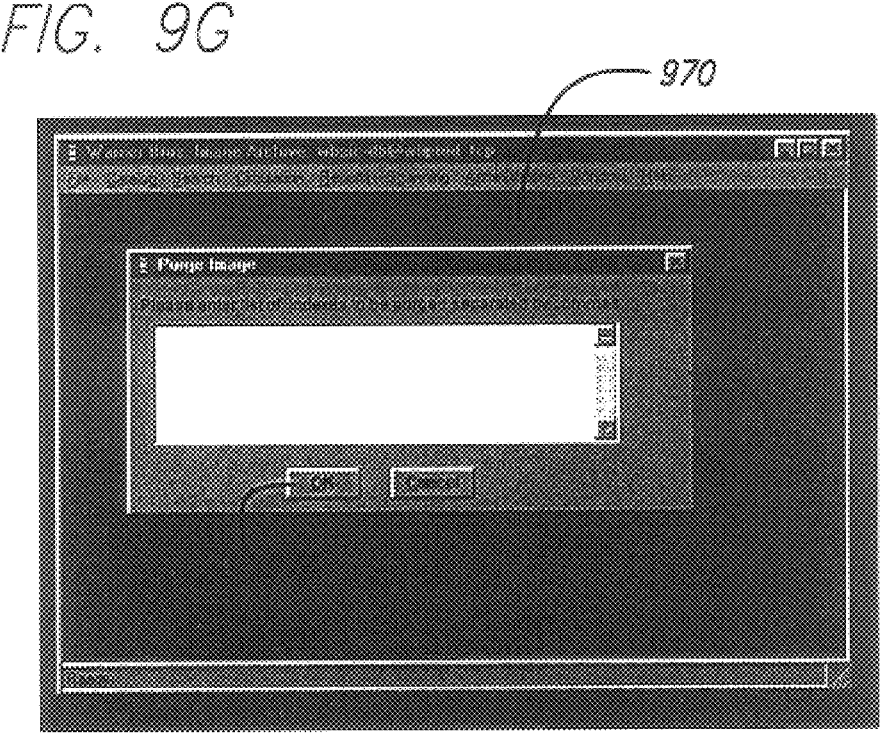
FIG. 9G is a sample purge image maintenance screen.

In order to delete images from the system database 124, the administrator clicks on the Administration button 710g and chooses the Purge Image choice 960 as depicted in FIG. 9F. The administrator accesses the Purge Image Maintenance Screen 970 as shown in FIG. 9G, and then enters the index numbers of the images to be deleted from the system database 124 in the Purge Image window 972. Once the index numbers have been entered, the administrator clicks on the OK button 974 within the Purge Image window 972 to permanently delete the images from the system database 124.

The Window 710h and the Help 710i buttons provide the usual functions of toggling among several open windows and offering help within the specific application, respectively. As outlined above, by utilizing the pull-down administration buttons 710a–710i, the administrator is able to manage the System 120 in a simplified and easy-to-use manner.

Having thus described a preferred embodiment of the method and apparatus for securely archiving and retrieving digital images from a digital image library in a fast, efficient manner, it should be apparent to those skilled in the art that certain advantages have been achieved. It should also be appreciated that various modifications, adaptations, and alternative embodiments thereof may be made within the scope and spirit of the present invention. The invention is further defined by the following claims.

What is claimed is:

1. A method of providing a remote user with a centralized image processing environment, comprising the steps of:
   assigning an access level to the remote user based in part on predetermined criteria;
   archiving images in a storage area;
   searching said archived images to provide a search result set of images;
   retrieving said search result set of images to permit user selection of images from said search result set of images;
   permitting the user to view images selected for viewing in a format that is based in part on the access level of the user;
   processing of images selected for processing; and
   tracking status of said processing step in real-time.

2. The method according to claim 1, wherein said archiving step further comprises ultra-high resolution digital scanning of said images.

3. The method according to claim 2, wherein said archiving step further comprises storing said images in a digital tape library.

4. The method according to claim 1, wherein said searching step further comprises searching for matching terms within image content descriptors associated with respective ones of said archived images.

5. The method according to claim 1, wherein said permitting step further comprises providing said images selected for viewing to said user in a thumbnail format.

6. The method according to claim 1, wherein said permitting step further comprises providing said images selected for viewing to said user in a medium-resolution format.

7. The method according to claim 1, wherein said archiving step further comprises designating image content descriptors for each one of said archived images.

8. The method according to claim 1, wherein said assigning step further comprises assigning an administrator level governing addition and restriction of other ones of said users.

9. The method according to claim 1, wherein said assigning step further comprises assigning a cataloger level governing addition, editing, and deletion of cataloging information for said images.

10. The method according to claim 1, wherein said assigning step further comprises assigning a scanner level governing scanning and loading of said images into said storage area.

11. The method according to claim 1, wherein said assigning step further comprises assigning a circulation level governing transmission of images selected for transmission to another one of said users.

12. The method according to claim 1, wherein said permitting step further comprises embedding a watermark in said images selected for viewing, based on the access level of the user.

13. The method according to claim 1, wherein said retrieving step further comprises adding images selected for adding to a lightbox.

14. The method according to claim 13, further comprising adding notes to said lightbox.

15. The method according to claim 1, wherein said processing step further comprises approving/disapproving delivery of said images selected for processing to a particular one of said users.

16. The method according to claim 1, wherein said processing step further comprises transmitting online of said images selected for processing to another one of said users.

17. The method according to claim 1, wherein said processing step further comprises delivering re-created images of said images selected for processing to one of said users in a tangible form, said re-created images substantially similar in resolution quality to original images.

18. The method according to claim 1, wherein said processing step further comprises downloading of said images selected for processing selected ones in an high-resolution format to one of said users.

19. The method according to claim 1, further comprising providing a Web-accessible graphical user interface usable for said searching and permitting steps.

20. The method according to claim 1, wherein said images comprise of audio.

21. The method according to claim 1, wherein said images comprise of video.

22. A computer-implemented image processing system, comprising:
 a Web server connected to a network, said Web server coupled to a memory comprising a digital archive of images, wherein said Web server is responsive to search requests from users of said network for particular images from said database; and,
 an administrator processor coupled to said Web server, said administrator processor executing instructions to provide the functions of:
  assigning an access level to the users based in part on predetermined criteria;
  archiving said images in said memory;
  searching said digital archive based on user-defined search criteria;
  retrieving images selected for viewing that satisfy said user-defined search criteria in a preview format that is based in part on the access level of the user; and,
  delivering images selected for delivering in a user selected format.

23. The system according to claim 22, wherein said network comprises an Intranet.

24. The system according to claim 22, wherein said network comprises an Internet.

25. The system according to claim 22, wherein said digital archive further comprises a digital tape library.

26. The system according to claim 22, wherein said digital archive further comprises ultra-high resolution scans of said images.

27. The system according to claim 22, wherein said searching function further comprises matching said user-defined criteria within image content descriptors associated with respective ones of said archived images.

28. The system according to claim 22, wherein said preview format comprises a thumbnail format.

29. The system according to claim 22, wherein said preview format comprises a medium-resolution format.

30. The system according to claim 22, wherein said archiving function further comprises designating image content descriptors for each one of said archived images.

31. The system according to claim 22, wherein said assigning function further comprises assigning an administrator level governing addition and restriction of other ones of said users.

32. The system according to claim 22, wherein said assigning function further comprises assigning a cataloger level governing addition, editing, and deletion of cataloging information for said images.

33. The system according to claim 22, wherein said assigning function further comprises assigning a scanner level governing scanning and loading of said images into said memory.

34. The system of according to claim 22, wherein said assigning function further comprises assigning a circulation level governing transmission of images selected for transmission to another one of said users.

35. The system according to claim 22, wherein said retrieving function further comprises embedding a watermark in said images, based on the access level of the user.

36. The system according to claim 22, wherein said retrieving function further comprises adding images selected for adding to a lightbox.

37. The system according to claim 36, wherein said retrieving function further comprises adding notes to said lightbox.

38. The system according to claim 22, wherein said delivering function further comprises approving/disapproving delivery of said images selected for delivering to a particular one of said users.

39. The system according to claim 22, wherein said administrator processor further provides the function of transmitting online of images selected for transmitting to another one of said users.

40. The system according to claim 22, wherein said user selected format comprises re-created images in tangible form of said images selected for delivering, said re-created images substantially similar in resolution quality to original images.

41. The system according to claim 22, wherein said user selected format comprises high-resolution computer downloads of said images selected for delivering.

42. The system according to claim 22, wherein a Web-accessible graphical user interface provides access to said searching and retrieving functions.

43. The system according to claim 22, wherein said images comprise of audio.

44. The system according to claim 22, wherein said images comprise of video.

* * * * *